`United States Patent Office`  3,563,947
Patented Feb. 16, 1971

3,563,947
CHLOROPRENE POLYMERS CONTAINING NORBORNENE DERIVATIVES AS ANTIOZONANTS
Wilhelm F. Gruber, Wilmington, Del., assignor to E. I. du Pont de Nemours and Company, Wilmington, Del., a corporation of Delaware
No Drawing. Filed June 9, 1969, Ser. No. 831,771
Int. Cl. C08d 11/04
U.S. Cl. 260—45.85                9 Claims

ABSTRACT OF THE DISCLOSURE

Elastomeric chloroprene polymers, for use under severe flexing and stretching conditions and where color development and substrate-staining must be avoided, are given enhanced stability against deterioration by ozone by incorporating therein about from 0.3 to 10 parts, per 100 parts of polymer, of a di-norbornene compound having the structure:

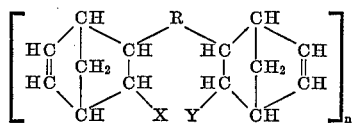

wherein X and Y are, independently, hydrogen, alkyl, aryl, aralkyl or alkaryl; R is a divalent organic radical containing at least two carbon atoms; and $n$ is a number in the range of 1 to 3.

BACKGROUND OF THE INVENTION

This invention is in the field of improving elastomeric chloroprene polymers.

Although elastomeric chloroprene polymers are exceptionally resistant to attack by atmospheric ozone, it is often desirable to render them even more stable in this regard. In certain applications in which the elastomer is flexed or stretched particularly at elevated temperatures, it is relatively susceptible to deterioration by ozone. Even in uses in which the elastomer remains static, local high concentrations of ozone in the atmosphere may increase the susceptibility of the elastomer to attack.

Various compounds are known to have antiozonant activity in chloroprene polymers, but their use is often accompanied by adverse effects on the compounded or cured elastomers. One problem often encountered, for example, is poor storage stability of compounded stocks—that is, the compounded elastomers tend to increase in viscosity during storage, presumably because of premature chain extension or cross-linking. Another disadvantage often encountered is the tendency of stocks containing certain antiozonants either to develop undesirable color or to stain substrates in contact with the compounded elastomers.

SUMMARY

Now according to the present invention it has been found that the foregoing and related problems are substantially avoided, and elastomeric chloroprene polymers stabilized against ozone degradation to a high degree are produced, by incorporating into 100 parts by weight of the polymers about from 0.3 to 10 parts by weight of a di-norbornene compound having the structure

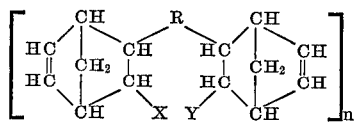

wherein X and Y are, independently, hydrogen, alkyl, aryl, aralkyl or alkaryl; R is a divalent organic radical containing at least two carbon atoms; and $n$ is a number in the range of 1 to 3.

The ring structure shown above is named by Chemical Abstracts as bicyclo[2.2.1]hept-2-ene. A trivial name for the ring is norbornene. The radical "norbornenyl" is used to mean the radical "bicyclo[2.2.1]hept-5-en-2-yl" or, "5-norbornen-2-yl."

DESCRIPTION OF THE PREFERRED EMBODIMENTS

In the general structure shown above the R radical is a divalent organic radical which contains at least two carbon atoms. This radical can be a hydrocarbon radical or can contain one or more linkages such as ether (—O—), thioether (—S—), $$\text{carbonyl} \, (-\underset{\underset{O}{\|}}{C}-)$$

sulfonyl (—SO$_2$—), or ester $$(-O-\underset{\underset{O}{\|}}{C}- \text{ or } -O-\underset{\underset{O}{\|}}{C}-O-)$$

linkages. Other linkages are possible provided the group introduced does not adversely affect the curing of the chloroprene polymer, as would be the case if an amino nitrogen were included in the radical. If instead of the norbornene rings, the corresponding cyclohexene rings are substituted, antiozonants having substantially less efficacy are obtained.

Representative examples of hydrocarbon R— radicals are those containing 2 to 20 carbon atoms, which can be saturated or unsaturated, branched or unbranched, aliphatic, cycloaliphatic, or aromatic. For example, the compound, 1,2-di(bicyclo[2.2.1]-5-hepten-2-yl)ethane is disclosed in U.S. Pat. 3,201,453. The disubstituted ethane structure can be replaced by other divalent radicals such as those derived from propane, butane, butene, hexane, pentane, pentene, cyclohexane, cyclohexene, benzene, alkyl-substituted benzenes, or naphthalene. The chain can contain a combination of aliphatic and aromatic structures. The above compounds can be prepared, for example, using Grignard reagents as intermediates. Another example of a compound in which R is a hydrocarbon is the dimer of 1-(2-norbornene-5-methyl)cyclopentadiene which can be prepared by condensing cyclopentadienyl sodium with 5-chloromethyl-2-norbornene and dimerizing the resulting compound by heat.

Because hydrocarbon compounds of the above type are relatively difficult and expensive to prepare, the preferred compounds are those in which the two norbornene radicals are connected through oxygen-containing groups. These can be prepared from known compounds such as 5-norbornene-2-methanol, 5 - norbornene - 2 - carboxaldehyde, and 5-norbornene-2-carboxylic acid. A wide variety of suitable compounds can be prepared from these starting intermediates.

For example, commercially available 5-norbornene-2-methanol can be etherified with a wide variety of dihydroxy compounds or the corresponding dichloro or dibromo compounds. 5-Norbornene-2-carboxaldehyde can, for example, be reacted with acetone to give a compound in which the R radical has the structure

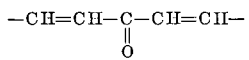

5-norbornene-2-methanol can be esterified with difunctional compounds to yield the corresponding esters. An especially preferred class of compounds are those prepared by esterifying 5-norbornene-2-methanol with a dicarboxylic acid such as, for example, oxalic acid, malonic acid, adipic acid, sebacic acid, fumaric acid, maleic acid, phthalic acid, terephthalic acid, isophthalic acid, napthalenedicarboxylic acids, benzene diacetic acid, cyclohexanedicarboxylic acid, cyclohexanediacetic acid, and the like.

In the structure shown above, X and Y represent hydrocarbon substituents such as alkyl, aryl, cycloalkyl, aralkyl, and alkaryl radicals. It is preferred, however, that these groups should be hydrogen or a lower alkyl radical containing one to four carbon atoms.

Some of the compounds disclosed in U.S. Pat. 3,201,453 are suitable.

A fuller discussion of the above and other reactions and reaction products of 5-norbornene-2-methanol is given in the bulletin entitled "Cyclol" and designated CD104, published by Interchemical Corporation, dated Sept. 14, 1959.

The double bond in the norbornene nucleus is relatively stable to homopolymerization. However, certain compounds in which the R radical contains active unsaturation may be "bodied" by heating as it is within the scope of this invention to use heat-polymerized materials, such as those containing up to 3 monomer units. It is desirable that the degree of polymerization should not proceed to the extent that the material is incompatible with the polychloroprene elastomer.

The amount of antiozonant required for stabilization ranges from about 0.3 to about 10 parts by weight per 100 parts of polymer. At least about 0.3 part is required in order to produce a significant effect. More than about 10 parts is not practical because in these large amounts the antiozonant adversely affects the tensile properties of the elastomer. The preferred amount ranges from about 0.5 to about 3 parts.

The chloroprene polymers in which the antiozonants are used are homopolymers of chloroprene (2-chloro-1,3-butadiene) and copolymers of chloroprene with up to an equal weight thereof of a monomer or monomers copolymerizable with chloroprene. Suitable copolymerizable monomers are compounds of the following representative types: vinyl-substituted aromatic compounds, such as styrene, vinyltoluenes, and vinylnaphthylenes; acrylic and methacrylic acids and derivatives thereof such as esters and nitriles, e.g., methyl methacrylate and acrylonitrile; and conjugated diolefinic compounds such as 1,3-butadiene, isoprene, and 2,3-dichloro-1,3-butadiene.

The chloroprene polymers can be of the sulfur-modified type or can be of the type containing no sulfur.

Various commercially available chloroprene polymers, in all of which the antiozonants of this invention are useful, are described in Encyclopedia of Polymer Science and Technology, vol. 3, pages 705–730, Interscience Publishers (1965).

The antiozonant can be used with such other conventional compounding ingredients as antioxidants, vulcanization accelerators, fillers and reinforcing agents. For a discussion of methods of compounding chloroprene polymers see, for example, Murray and Thompson, "The Neoprenes," Elastomer Chemicals Department, E. I. du Pont de Nemours and Co., copyright 1963.

The antiozonant compound can be added to the chloroprene polymer along with the other compounding ingredients using standard compounding techniques. Alternatively, it can be incorporated into the latex before the polymer is isolated. This can be accomplished, for example, by dissolving the antiozonant in a suitable solvent, such as an aromatic hydrocarbon, emulsifying this solution with water, adding the emulsion to the elastomer latex, co-coagulating the emulsion solids, isolating, and drying.

The antiozonants of this invention provide excellent protection against attack by ozone without significantly increasing the tendency of the compounded stock to crosslink prematurely during storage. Chloroprene polymers containing the antiozonants are non-staining and do not discolor substrates to any significant degree. The cured elastomers cotaining the antiozonants, particularly in the preferred amounts, show essentially no decrease in tensile properties.

The invention will be better understood by reference to the following illustrative examples.

EXAMPLE 1

(I) Preparation of antiozonant compounds

Compound A—1,4 - bis(2 - norbornen-5-ylmethoxy)-2-butene.—5-norbornene-2-methanol (124 g., 1 mole) is reacted with finely-dispersed sodium (23 g., 1 gram atom) in 500 ml. of benzene under nitrogen. The reaction mixture is held at 35–45° C. and is agitated vigorously. When most of the sodium has disappeared the reaction mixture is heated to reflux and refluxing is continued for one hour. The mixture is then cooled to 50° C., 1.0 g. of finely powdered sodium iodide is added and 63 g. (0.5 mole) of freshly distilled 1,4-dichloro-2-butene is added slowly. The mixture is refluxe for 5 hours, cooled, and washed with water until it is neutral. The ether is purified by vacuum distillation. It has a boiling point (0.35–0.40 mm. Hg) of 159–166° C. The yield is 82 g. (55%).

The infrared spectrum displays a strong ether band at 9.1μ. No contamination by alcoholic hydroxyl groups is evident. The band characteristic of the bicyclic structure is seen at 6.4μ, that of the trans CH=CH at 10.4 and that of the cis CH=CH at 14.0μ.

Analysis.—Calcd. for $C_{20}H_{28}O_2$ (percent): M.W., 300; O, 10.65. Found (percent): M.W., 288; O, 10.48.

Compound B—Bis[2 - (norbornen-2-ylmethoxy)ethyl] ether.—5-norbornene-2-methanol (124 g., 1 mole) and 56 g. (1.04 mole) of sodium methoxide in 750 ml. of xylene are heated under nitrogen with vigorous agitation at 110–120° C. for 24 hours and refluxed for 2 hours. The mixture is cooled to 45° C. and 2 g. of finely powdered sodium iodide and 75 g. (0.524 mole, 62.5 ml.) of bis(2-chloroethyl) ether are added with continued agitation. Since no heat of reaction is observed, the reaction mixture is again heated to 120° C. for 6 hours. After cooling, the organic layer is washed exhaustively with water, and the product is purified by vacuum distillation. The yield is 18 g. (11%) of a liquid boiling at 170–174° C. (23 mm. Hg).

Analysis.—Calcd. for $C_{20}H_{30}O_3$ (percent): M.W., 318.24; O, 15.08. Found (percent): M.W., 258; O, 15.19.

Compound C—1,5 - bis(5 - norbornen-2-yl)-1,4-pentadien-3-one—To a solution of 120 g. (3 mole) of sodium hydroxide in 3000 ml. of 50% aqueous alcohol is added 65 g. (0.532 mole) of 5-norbornene-2-carboxaldehyde and 10.5 g. (0.177 mole, 13 ml.) of acetone under a blanket of nitrogen. The mixture darkens and precipitates a gum-like mass. Agitation is continued at room temperature until the amount of precipitate no longer increases. The supernatant liquid is then decanted. The resin-like residue is dissolved in ether and washed to neutrality. The solvent is evaporated off and the orange-yellow residue is dried under vacuum and analyzed without further purification. Yield, 77 g. (55% based on aldehyde).

Analysis.—Calcd. for $C_{19}H_{20}O$ (percent): C, 86.31; H, 7.63; M.W., 264.16. Found (percent): C, 85.9; H, 7.9; M.W., 42.1; $n=1.6$.

Compound D—Norbornen-2-ylmethyl 5-norbornen-2-carboxylate.—This compound is mentioned in U.S. Pat. 3,201,453.

A solution of 100 g. (0.82 mole) of 5-norbornene-2-carboxaldehyde and 5 g. of aluminum propoxide in 350 ml. of benzene is kept at 60° C. for 2 days. The solvent is then removed under vacuum and the residue is distilled through a short Vigreux column. The product boils at 96–102° C. (0.05 mm. Hg). The yield is 62.5 g. (62.5%). The product is redistilled for analysis.

Analysis.—Calcd. $C_{16}H_{20}O_2$: C, 78.65%; H, 8.26%; M.W., 244.16. Found: C, 78.5; H, 8.1; M.W., 244.

Compound E—Ester of Ethylene glycol with 5-norbornene-2-carboxylic acid.—The methyl ester of 5-norbornene-2-carboxylic acid is prepared by condensing cyclopentadiene with methyl acrylate in a Diels-Alder reaction as described in J. Am. Chem. Soc. 64, 2457 (1942). Freshly distilled ethylene glycol (24.5 g., 0.395 mole, 22 ml.) is reacted with 0.15 g. (0.0065 gram atom) of sodium. Methyl 5-norbornene-2-carboxylate (197 g., 1.30 mole is added and the temperature is kept at 95° C. until no more methanol distills off. 25 milliliters of product (81%) are obtained in 5 hours. The reaction mixture is cooled, diluted with 450 ml. ether, and washed with water to neutrality. After removal of the solvent and the excess of starting material, the residue is distilled under vacuum. The yield is 107 g. (89.7%) of material boiling at 145–150° C. (0.30–0.35 mm. Hg).

Analysis.—Calcd. for $C_{18}H_{22}O_4$: M.W., 302.18. Found: M.W., 305 (benzene).

Compound F—Ester of 5-norbornene-2-methanol with adipic acid.—A solution of 100 g. (0.547 mole) of adipoyl chloride in 150 ml. of benzene is slowly added to a mixture of 150 g. (1.21 mole) of 5-norbornene-2-methanol in 150 ml. of benzene at 50–60° C. while introducing nitrogen into the reaction mixture. The mixture is then refluxed for 3 hours. After cooling, the mixture is washed with ether, separated, and the organic layer is washed with water, 3–5% aqueous sodium bicarbonate, and again with water. The solvent is evaporated off and the small excess of norbornene-methanol is distilled off under vacuum. The yield is 166.3 g. (85%) of product.

Analysis.—Calcd. for $C_{22}H_{20}O_4$: M.W., 358.24. Found: M.W., 376.

Compound G—Ester of 5-norbornene-2-methanol with maleic acid.—This is a commercially available compound.

A mixture of 49 g. (0.5 mole) of maleic anhydride, 124 g. (1.0 mole) of 5-norbornene-2-methanol, 0.5 g. of an acidic catalyst ("Amberlite" No. 15, an ion-exchange resin containing sulfonic acid groups, marketed by Rohm & Haas) and 350 ml. of toluene is refluxed with a water separator for 20 hours. Only 4 ml. of water separates. After filtering off the catalyst and distilling off the solvent, the residue is distilled under vacuum giving the substantially pure monomer having a boiling point (0.27–0.75 mm. Hg) of 175–180° C. The yield is 45 g. (29%).

Analysis.—Calcd. for $C_{20}H_{24}O_2$: M.W., 328.19. Found: M.W., 324 (chloroform).

Compound $G_1$.—This material is purchased from Interchemical Corp. It is the same as compound G but has been "bodied" by heating so that it has a molecular weight of 414 ($n=1.26$).

Compound H—Ester of 5-norbornene-2-methanol with succinic acid.—A mixture of 50 g. (0.5 mole) of succinic anhydride, 124 g. (1.0 mole) of 5-norbornene-2-methanol, 1.1 g. of p-toluenesulfonic acid, and 350 ml. of benzene is refluxed for 15 hours with a water separator. Only 3.5 ml. of water separates. After washing with water, three portions of 250 ml. of 1% aqueous sodium hydroxide, and finally water, the product is isolated by removal of the solvent and unesterified norbornene-methanol under vacuum (0.5 mm. Hg and 70–80° C. waterbath temperature). The pot residue weighs 46 g. (40% yield).

Analysis.—Calcd. for $C_{20}H_{26}O_4$: M.W., 330.21. Found: M.W. 329. Acid No., 1.3.

Compound I—Ester of 5-norbornene-2-methanol with sebacic acid.—This compound is disclosed in U.S. Pat. 2,526,395.

A mixture of 75 g. (0.371 mole) of sebacic acid and 275 g. (2.22 mole) of 5-norbornene-2-methanol is heated under nitrogen to 180° C. for 3 hours and to 230° C. for 2 hours. During the first phase water distills off and at the increased temperature most of the excess alcohol distills off. The rest of the volatile products are removed by heating to 90–95° C. for 3 hours at a pressure of <0.5 mm. Hg. This crude material is analyzed and tested.

Analysis.—Calcd. for $C_{26}H_{38}O_4$: M.W., 414.30. Found: M.W., 412 (benzene). Acid No., 2.6.

Compound J—Ester of 5-norbornene-2-methanol with phthalic acid—A mixture of 74 g. (0.5 mole) of phthalic anhydride, 124 g. (1.0 mole) of 5-norbornene-2-methanol, 1.1 g. of p-toluenesulfonic acid, and 350 ml. of benzene is refluxed for 9 hours. Only 3.5 ml. of water is removed. The catalyst and acid are washed out with 0.5% aqueous sodium hydroxide. Solvent and unreacted starting material are removed by vacuum distillation. A residue of 79 g. (42% yield) remains. The infrared spectrum does not reveal any contamination with alcohol or anhydride.

Analysis.—Calcd. for $C_{24}H_{26}O_4$: M.W., 378.21. Found: M.W., 399. Acid No., 11.1.

Compound K—Ester of 5-norbornene-2-methanol with terephthalic acid—A transesterification reaction is carried out by heating at 120° C. a mixture of 97 g. (0.5 mole) of dimethyl terephthalate and 200 g. (1.615 mole) of 5-norbornene-2-methanol with 2.0 g. of sodium methoxide in a stream of nitrogen until no more methanol distills off (12 hours). The reaction mass is cooled, dissolved in benzene, and washed with water, then with 3–5% sodium bicarbonate solution, and finally with water. Solvent and unreacted norbornene-methanol are removed by vacuum distillation. The crude product crystallizes and weighs 184 g. (93%). It has a melting point of 105–107° C. After two recrystallizations from ether the melting point of 109–111° C. (corr.) is obtained, which does not change after repeated recrystallization.

Analysis.—Calcd. for $C_{24}H_{26}O_4$: C, 766.12%; H, 6.93%; M.W., 378.21. Found: C, 86.0; H, 6.9; M.W., 384.

Compound L—Ester of 5-norbornene-2-methanol with isophthalic acid.—This compound is prepared in the same way as compound K. The product (166 g., 88%) is a viscous oil which remains as a residue after removal of the volatile materials under vacuum.

Analysis.—Calcd. for $C_{24}H_{26}O_4$ (percent): M.W., 378.21. Found (percent): M.W., 376 (acetone). Acid No. 0.5.

Compound M—Ester of 5-norbornene-2,3-dicarboxylic acid with 5-norbornene-2-methanol.—A mixture of 60 g. (0.367 mole) of 5-norbornene-2,3-dicarboxylic acid anhydride and 250 g. (2.02 mole) of 5-norbornene-2-methanol is heated to 180° C. for 3 hours using nitrogen to entrain water. The temperature is raised to 230° C. for 2 hours, during which time most of the excess of alcohol distills off. The remainder of the volataile material is removed in vacuo (<0.5 mm. Hg) at 90–95° C. bath temperature for 3 hours, leaving behind a yellow, glass-like mass (130 g., 90% yield). The infrared spectrum shows traces of the hydroxy band and a peak with a shoulder at 5.8μ indicative of contamination by the anhydride starting material. Nevertheless, the substance is analyzed and tested.

Analysis.—Calcd. for $C_{25}H_{30}O_4$ (percent): M.W., 394.24. Found (percent): M.W. 368 (benzene). Acid No., 2.8.

(II) Testing

The recipe used in compounding the stocks is the following:

| | Parts |
|---|---|
| Chloroprene polymer (Prepared as in Example 1 of U.S. Pat. 2,914,497) | 100 |
| Magnesia | 4 |
| 2,2' - methylenebis(6 - tert - butyl - p - cresol) (antioxidant) | 2 |
| Stearic acid | 0.5 |
| Titanium dioxide | 10 |
| Suprex clay | 90 |
| Process oil | 10 |
| Zinc oxide | 0.75 |
| 2-mercapto-2-imidazoline (accelerator) | 0.75 |
| Antiozonant compound prepared as above-described | 2 |

The Mooney scorch properties of the compounded stocks are measured at 121° C. immediately after mixing the stock with all compounding ingredients except the accelerator. The testing is carried out by ASTM Method D 1646–61 using the small rotor. Bin storage stability is evaluated by comparing the minimum viscosity reading before and after storage. An increase in this reading during storage indicates that premature cross-linking has occurred. Scorchiness of the compounded stocks is compared by observing the viscosity reading after 45 minutes during the Mooney scorch test. An increase in the viscosity indicates that cross-linking is occurring even in the absence of the vulcanization accelerator and thus shows the effect of the antiozonant on scorchiness of the stock.

For the tests of the antiozonant activity, samples of stock containing the accelerator (2-mercapto-2-imidazoline) are cured in a press at 153° C. for 25 minutes.

The antiozonant effect is measured by exposing cured samples to ozone in a test chamber at 40° C. using an ozone concentration of 3 parts per million. For static exposures, samples of the vulcanizates 0.25 x 0.075 x 6 inches in dimension, mounted on varnished wooden racks, are subjected to tensile strains of 20 percent. The dynamic tests are carried out by the "roller" method described in Rubber Chemistry and Technology 32, 1119 (1959). The test pieces are flexed at a rate of 30 cycles per minute. The number of hours required to produce a given degree of cracking is observed.

The stress/strain properties are measured by ASTM Method D 412–64 T. These properties are measured to show any adverse effect of the antiozonant.

Table I gives a summary of the structures of the compounds tested. Table II gives the results of the antiozonant tests and Table III reports the results of Mooney Scorch and stress/strain testing.

TABLE I.—SUMMARY OF STRUCTURES

General Structure

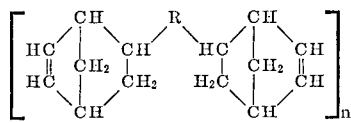

(n=1 unless otherwise specified.)

| Compound designation | R |
|---|---|
| Ethers: | |
| A | $-CH_2OCH_2CH=CHCH_2OCH_2-$ |
| B | $-CH_2OCH_2CH_2OCH_2CH_2OCH_2-$ |
| Ketones: | |
| C | $-CH=CH-CO-CH=CH-$  n=1.6 |
| Esters: | |
| D | $-CH_2O-CO-$ |
| E | $-CO-O-CH_2CH_2-O-CO-$ |
| F | $-CH_2O-CO-(CH_2)_4-CO-O-CH_2-$ |
| G | $-CH_2O-CO-CH=CH-CO-O-CH_2-$ |
| $G_1$ | Same as G, purchased material "bodied"  n=1.26 by heating. |
| H | $-CH_2O-CO-CH_2CH_2-CO-O-CH_2-$ |
| I | $-CH_2O-CO-(CH_2)_8-CO-O-CH_2-$ |
| J | $-CH_2O-CO-C_6{}^oH_4-CO-O-CH_2-$ |
| K | $-CH_2O-CO-C_6{}^pH_4-CO-O-CH_2-$ |
| L | $-CH_2-O-CO-C_6{}^mH_4-CO-O-CH_2-$ |
| M | $-CH_2-O-OC\diagdown\diagup CH_2-O-OC\diagup$ (cyclohexyl diester structure) |

TABLE II.—ANTIOZONANT EFFECTIVENESS

[Note: The greater than sign (>) indicates that appreciable cracking has not been observed at the end of the specified hours]

| Antiozonant compound | Static testing—hours to appreciable cracking | Dynamic testing hours to appreciable cracking |
|---|---|---|
| None, control | 3 | 3 |
| Typical results: | | |
| A | >228 | 27 |
| B | >228 | 16 |
| C | >218 | 29 |
| D | >218 | 28 |
| E | >218 | 24 |
| F | >268 | 35 |
| G | >318 | 24 |
| $G^1$ | >460 | 24 |
| H | >307 | 12 |
| I | >307 | 25 |
| J | >460 | 15 |
| K | >460 | 28 |
| L | >307 | 12 |
| M | >307 | 12 |
| Commercial antiozonant [1] | >268 | 10–14 |

[1] "Akroflex" AZ.

TABLE III.—MOONEY SCORCH AND STRESS/STRAIN PROPERTIES

| | Mooney scorch minimum reading | | After 2 weeks at 38 °C. | | Stress strain | | |
|---|---|---|---|---|---|---|---|
| Antiozonant | Original minutes | After 45 minutes | Minutes | After 45 minutes | $M_{300}$ | $T_B$ | $E_B$ |
| None control | 21 | 24 | 19 | 21 | 745 | 2,375 | 770 |
| Typical results: | | | | | | | |
| A | 16 | 17 | 16 | 17 | 1,050 | 2,445 | 825 |
| B | 15 | 16 | 15 | 17 | 960 | 2,395 | 820 |
| C | 22 | 28 | 22 | 27 | 770 | 2,445 | 755 |
| D | 21 | 23 | 24 | 26 | 780 | 2,490 | 755 |
| E | 19 | 20 | 23 | 24 | 860 | 2,475 | 745 |
| F | 21 | 24 | 24 | 27 | 840 | 2,540 | 760 |
| G | 20 | 21 | 23 | 23 | 1,100 | 2,125 | 755 |
| K | 19 | 21 | 22 | 23 | 1,020 | 2,510 | 730 |

From the above data it can be seen that the antiozonants of this invention have no significant effect on bin storage stability or scorchiness of the compounded stocks. Also there is no significant effect on tensile properties of the cured elastomers.

EXAMPLE 2

A polychloroprene latex is prepared essentially as described in Example 1 of U.S. 2,914,497. Bis(5-norbornenemethyl)maleate which has been bodied by heating to a molecular weight of 414 (Compound $G_1$ of Example 1) is added to the latex after unreacted chloroprene has been removed and before drum drying. The antiozonant is added as an emulsion prepared by dissolving 7.5 g. of the antiozonant in 7.5 g. of toluene and emulsifying this with 100 g. of water using 2.0 g. of sodium lauryl sulfate and 1.0 g. of the sodium salt of formaldehyde-naphthalenesulfonic acid condensate as emulsifying agents. The chloroprene polymer containing the antiozonant is isolated on a 12-inch chrominum-plated double drum dryer. The following compounding recipe is used:

| | Parts |
|---|---|
| Polymer containing antiozonant | 100 |
| Magnesia | 4 |
| 2,2'-methylenebis(6-tert-butyl-p-cresol) | 2 |
| Stearic acid | 0.5 |
| Titanium dioxide | 10 |
| Suprex clay | 90 |
| Process oil | 12 |
| Petrolatum | 1 |
| Zinc oxide | 5 |
| 2-mercapto-2-imidazoline | 0.75 |
| Tetramethylthiuram disulfide | 0.5 |
| Antiozonant content | Varied |

Samples of the compounded stock are cured in a press for 30 minutes at 153° C. The sample containing 0.5 part of the antiozonant requires 15 hours for considerable cracking to occur in the dynamic test as compared with 9 hours for the control sample containing no antiozonant. The sample containing 2 parts of antiozonant requires 20 hours for considerable cracking to occur in the dynamic test and in the static tests shows no cracking after 200 hours of exposure. In the static tests the sample containing no antiozonant fails after 31 hours at 20% strain.

What is claimed is:

1. An ozone-resistant elastomeric composition comprising, by weight, 100 parts of a chloroprene polymer and about from 0.3 to 10 parts of a di-norbornene compound having the structure:

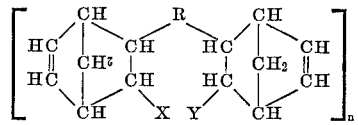

wherein X and Y are, independently, hydrogen, alkyl, aryl, aralkyl or alkaryl; R is a divalent organic radical containing at least two carbon atoms and is selected from the group consisting of hydrocarbon radicals and substituted-hydrocarbon radicals which contain one or more moieties selected from the group consisting of ether, thioether, carbonyl, sulfonyl and carboxylic acid ester radicals; and $n$ is a number in the range of 1 to 3.

2. A composition of claim 1 wherein $n$ is 1.

3. A composition of claim 2 wherein R contains an ether group.

4. A composition of claim 2 wherein R contains a ketone group.

5. A composition of claim 2 wherein R contains an ester group.

6. A composition of claim 5 wherein the di-norbornene compound is di(bicyclo[2.2.1] - 5 - heptene-2-methyl) maleate.

7. A composition of claim 6 wherein the di-norbornene compound is di(bicyclo[2.2.1] - 5 - heptene - 2 - methyl) terephthalate.

8. A composition of claim 6 wherein the di-norbornene compound is di(bicyclo[2.2.1] - 5 - heptene-2-methyl) maleate.

9. A composition of claim 6 wherein the di-norbornene compound is 5 - norbornen-2-ylmethyl 5-norbornen-2-carboxylate.

References Cited

UNITED STATES PATENTS

| 2,526,395 | 10/1950 | Nichols et al. | 260—31.8 |
| 3,201,453 | 8/1965 | Manning et al. | 260—468 |
| 3,291,831 | 12/1966 | Luvisi | 260—45.9 |
| 3,345,419 | 10/1967 | Tinsley et al. | 260—611 |
| 3,453,329 | 7/1969 | Altwicker | 260—45.9 |

DONALD E. CZAJA, Primary Examiner

V. P. HOKE, Assistant Examiner

U.S. Cl. X.R.

260—45.7

PO-1050
(5/69)

UNITED STATES PATENT OFFICE
CERTIFICATE OF CORRECTION

Patent No. 3563947          Dated February 16, 1971

Inventor(s) WILHELM F. GRUBER

It is certified that error appears in the above-identified patent and that said Letters Patent are hereby corrected as shown below:

In claim 8, last line, "maleate" should be: adipate.

Signed and sealed this 14th day of December 1971.

(SEAL)
Attest:

EDWARD M. FLETCHER, JR.          ROBERT GOTTSCHALK
Attesting Officer          Acting Commissioner of P